United States Patent
Husband et al.

(10) Patent No.: US 10,077,671 B2
(45) Date of Patent: Sep. 18, 2018

(54) THERMALLY CONFORMABLE LINER FOR REDUCING SYSTEM LEVEL FAN BLADE OUT LOADS

(71) Applicant: UNITED TECHNOLOGIES CORPORATION, Hartford, CT (US)

(72) Inventors: Jason Husband, South Glastonbury, CT (US); Drew W. Lancaster, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 367 days.

(21) Appl. No.: 14/768,775

(22) PCT Filed: Mar. 11, 2014

(86) PCT No.: PCT/US2014/022932
§ 371 (c)(1),
(2) Date: Aug. 19, 2015

(87) PCT Pub. No.: WO2014/197031
PCT Pub. Date: Dec. 11, 2014

(65) Prior Publication Data
US 2016/0003084 A1    Jan. 7, 2016

Related U.S. Application Data

(60) Provisional application No. 61/779,279, filed on Mar. 13, 2013.

(51) Int. Cl.
| F01D 11/12 | (2006.01) |
| F02C 7/24 | (2006.01) |
| F01D 21/04 | (2006.01) |
| B05D 5/08 | (2006.01) |
| F01D 5/02 | (2006.01) |

(Continued)

(52) U.S. Cl.
CPC .......... F01D 11/122 (2013.01); B05D 5/083 (2013.01); F01D 5/02 (2013.01); F01D 11/127 (2013.01);
(Continued)

(58) Field of Classification Search
CPC ..... B05D 5/083; F01D 11/122; F01D 11/127; F01D 21/045; F01D 25/24; F01D 5/02;
(Continued)

(56) References Cited

U.S. PATENT DOCUMENTS

| 5,344,280 A | 9/1994 | Langenbrunner et al. |
| 6,227,794 B1 | 5/2001 | Wojtyczka et al. |

(Continued)

FOREIGN PATENT DOCUMENTS

| EP | 0927815 | 7/1999 |
| WO | 2012065155 | 5/2012 |

OTHER PUBLICATIONS

International Preliminary Report on Patentability for International Application No. PCT/US2014/022932 dated Sep. 24, 2015.

(Continued)

*Primary Examiner* — Mark Laurenzi
*Assistant Examiner* — Paul Thiede
(74) *Attorney, Agent, or Firm* — Carlson, Gaskey & Olds, P.C.

(57) ABSTRACT

A fan case for a gas turbine engine includes a fan case surrounding a fan with fan blades. A liner is disposed between the fan case and the fan and is spaced a radial distance from the fan case. A torque stop is arranged between the fan case and the liner. A method for reducing fan case liner loads is also disclosed.

12 Claims, 5 Drawing Sheets

(51) Int. Cl.
*F01D 25/24* (2006.01)
*F04D 29/52* (2006.01)

(52) U.S. Cl.
CPC .......... *F01D 21/045* (2013.01); *F01D 25/24* (2013.01); *F02C 7/24* (2013.01); *F04D 29/526* (2013.01); *F05D 2220/32* (2013.01); *F05D 2220/36* (2013.01); *F05D 2230/23* (2013.01); *F05D 2230/60* (2013.01)

(58) Field of Classification Search
CPC ...... F02C 7/24; F04D 29/526; F05D 2220/32; F05D 2220/36; F05D 2230/23; F05D 2230/60
USPC ................................................ 415/9; 60/223
See application file for complete search history.

(56) References Cited

U.S. PATENT DOCUMENTS

| | | | |
|---|---|---|---|
| 6,244,539 B1 * | 6/2001 | Liston | B64D 29/00 181/212 |
| 6,382,905 B1 | 5/2002 | Czachor et al. | |
| 6,637,186 B1 | 10/2003 | Van Duyn | |
| 7,914,251 B2 | 3/2011 | Pool et al. | |
| 8,029,231 B2 | 10/2011 | Evans | |
| 8,202,041 B2 | 6/2012 | Wojtyczka et al. | |
| 8,231,328 B2 | 7/2012 | Reed | |
| 8,297,912 B2 | 10/2012 | Reed | |
| 2008/0016844 A1 | 1/2008 | Shutrump | |
| 2009/0269197 A1 | 10/2009 | Evans | |
| 2010/0028129 A1 | 2/2010 | Reed | |
| 2011/0044806 A1 | 2/2011 | Harper | |
| 2011/0129330 A1 | 6/2011 | Farrell | |
| 2011/0211943 A1 * | 9/2011 | Belbeck | F01D 11/12 415/182.1 |

OTHER PUBLICATIONS

International Search Report and Written Opinion for International Application No. PCT/US2014/022932 dated Dec. 17, 2014.
Extended European Search Report for European Application No. 14807870.2, dated Sep. 28, 2016.

* cited by examiner

THERMALLY CONFORMABLE LINER FOR REDUCING SYSTEM LEVEL FAN BLADE OUT LOADS

BACKGROUND

This disclosure relates to a gas turbine engine component, such as a liner for a fan case.

Gas turbine engines typically include a fan section, a compressor section, a combustor section and a turbine section. The fan section may be housed in a fan case. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

A thermally conformable liner (TCL) may be present on the interior of the fan case. The TCL facilitates consistent thermal growth between the fan blades and rubstrips located on the TCL, allowing the tip clearance gap to remain constant with temperature. Currently, the TCL may be arranged directly adjacent to the fan case. During fan blade out (FBO) events, which may occur as a result of a bird strike, for example, a fan blade may become disconnected from the fan. A fan blade tip can dig into the rubstrips. This interaction generates a deceleration torque as well as axial loads. These FBO-induced loads tend to be very high, for example, several times the operating loads of the TCL.

SUMMARY

In one exemplary embodiment, a fan section for a gas turbine engine includes a fan case surrounding a fan with fan blades. A liner is disposed between the fan case and the fan and is spaced a radial distance from the fan case. At least one torque stop is arranged between the fan case and the liner.

In a further embodiment of the above, the ratio of the radial distance to a radius of the fan blades is 0.25:40.

In a further embodiment of any of the above, at least one of a radially inner surface of the fan case and a radially outer surface of the liner includes a low-friction coating.

In a further embodiment of any of the above, the low-friction coating is a Teflon® spray.

In a further embodiment of any of the above, at least one torque stop is frangible.

In a further embodiment of any of the above, at least one torque stop prevents rotation of the liner relative to the fan case.

In a further embodiment of any of the above, at least a portion of the liner is bonded to the fan case with an adhesive.

In a further embodiment of any of the above, at least one torque stop and the adhesive can withstand a tangential load given by the equation $(1+S)*T_{Rub}/R_{FanCase}/N_{TorqueStops}$, where S is a safety factor. $T_{Rub}$ is a rub torque generated by a 2.5 lb (1.3 kg) bird strike. $R_{FanCase}$ is a radius of the fan case. $N_{TorqueStops}$ is the number of torque stops.

In a further embodiment of any of the above, S is 0.35.

In a further embodiment of any of the above, the liner includes one or more rails which contact the fan case.

In a further embodiment of any of the above, the liner includes an abradable rubstrip adjacent to tips of the fan blades.

In a further embodiment of any of the above, the abradable rubstrip is arranged radially inward from at least one torque stop.

In a further embodiment of any of the above, a honeycomb structure is arranged between the t least one torque stop and the abradable rubstrip.

In a further embodiment of any of the above, an aluminum septum is arranged between the one torque stop and the abradable rubstrip.

In a further embodiment of any of the above, a Kevlar® layer is arranged between the one torque stop and the fan case.

In one exemplary embodiment, a method for reducing fan case liner loads includes the steps of providing a fan case surrounding a fan with fan blades, providing a liner disposed between the fan case and the fan and spaced radially apart from the fan case, providing at least one frangible stop arranged between the fan case and the liner and providing an anti-friction coating on one of the radially inner surface of the fan case and the radially outward surface of the liner.

In one exemplary embodiment, the anti-friction coating is a Teflon® spray.

In one exemplary embodiment, at least one stop prevents rotation of the liner relative to the fan case.

In one exemplary embodiment, a portion of the liner is bonded to the fan case with an adhesive.

In one exemplary embodiment, the liner includes one or more rails which contact the fan case.

BRIEF DESCRIPTION OF THE DRAWINGS

The disclosure can be further understood by reference to the following detailed description when considered in connection with the accompanying drawings wherein.

DETAILED DESCRIPTION

Figure 1:
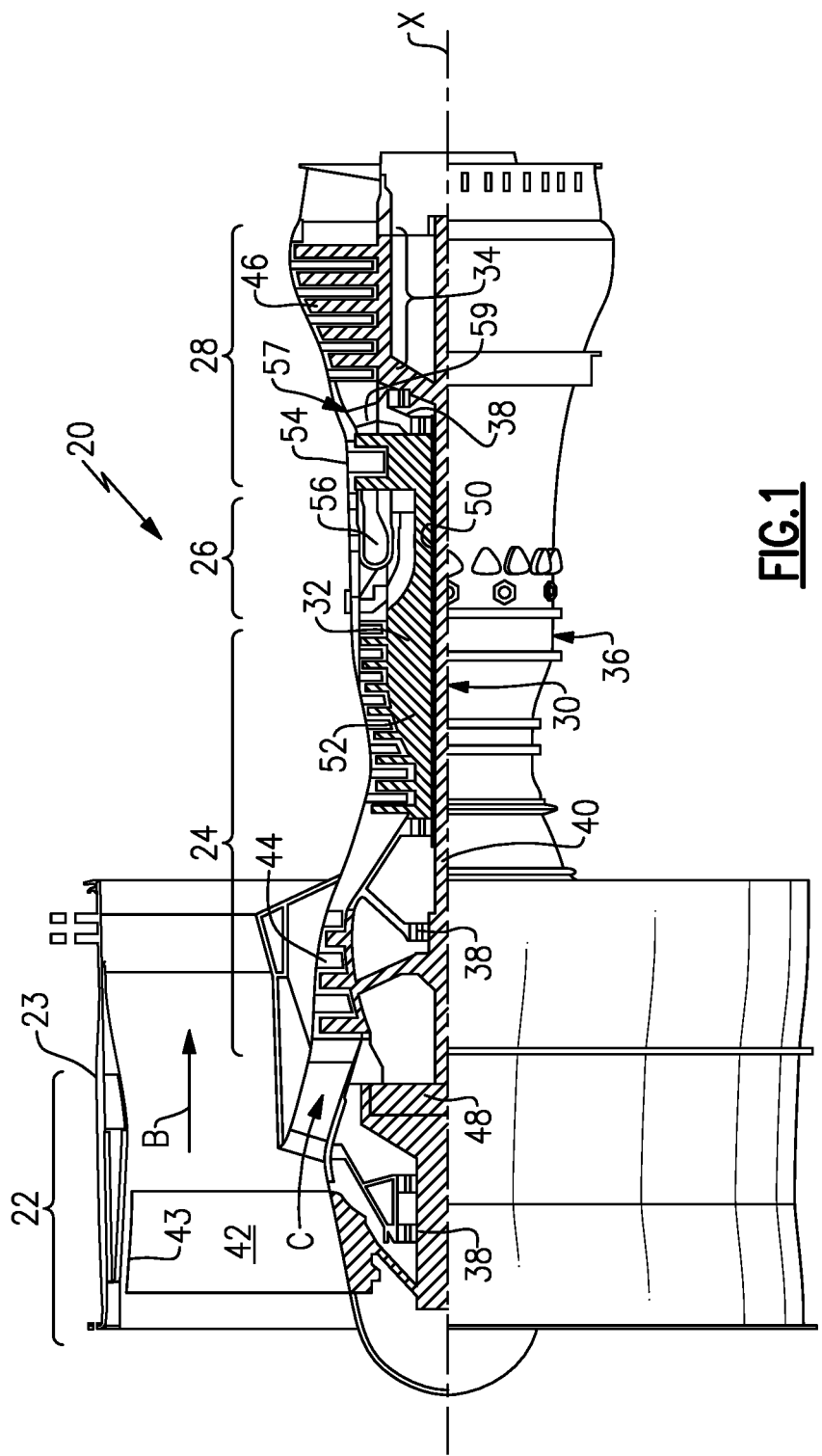
FIG. 1 schematically illustrates an example gas turbine engine embodiment.

FIG. 1 schematically illustrates an example gas turbine engine 20 that includes a fan section 22, a compressor section 24, a combustor section 26 and a turbine section 28. The fan section 22 is arranged in a fan case 23. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The fan 42 includes fan blades with tips 43. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram° R)/(518.7° R)]0.5. The "Low corrected fan tip speed", as disclosed herein according to one non-limiting embodiment, is less than about 1150 ft/second.

Figure 2:
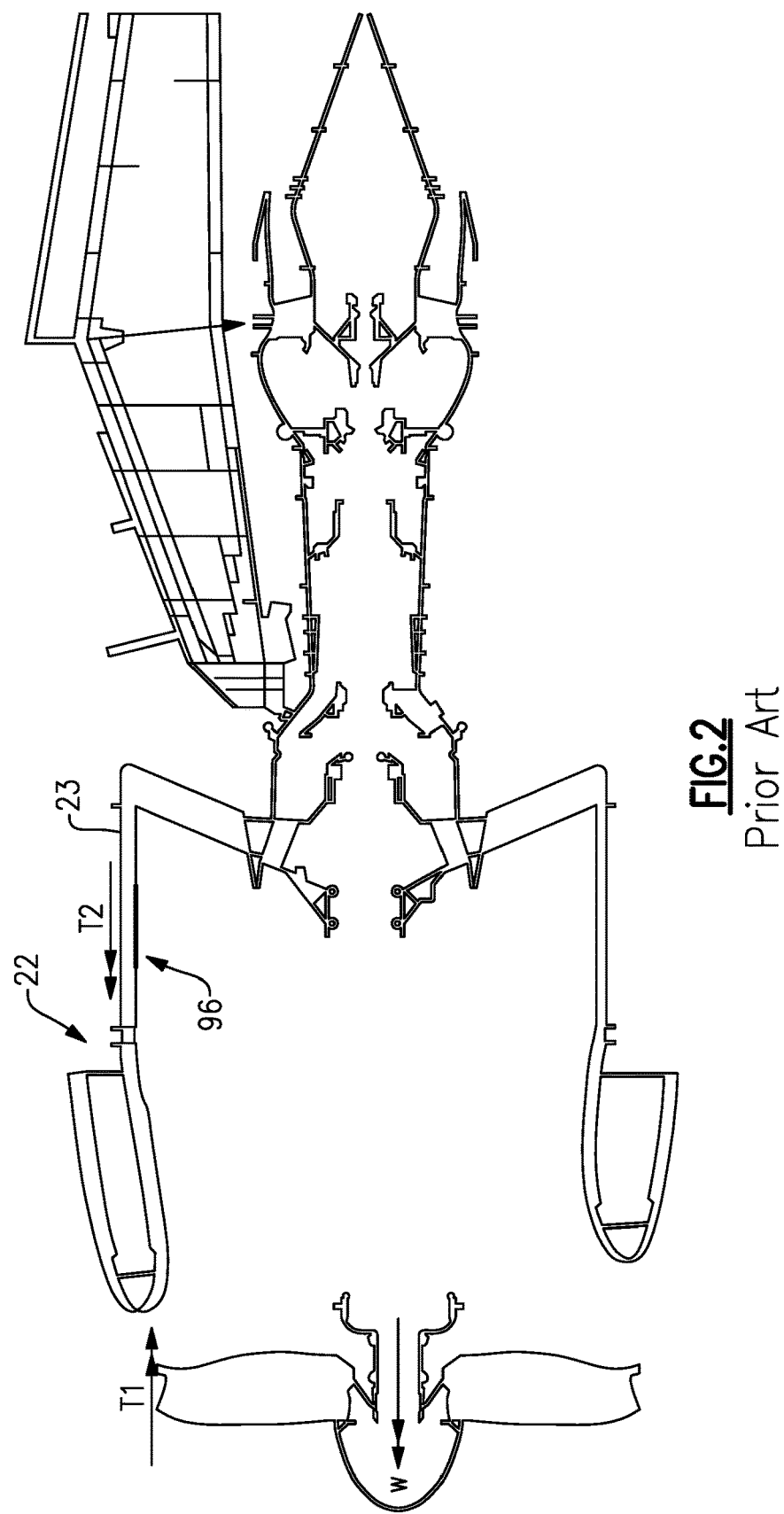
FIG. 2 illustrates a schematic detail view of the prior art gas turbine engine fan case.

FIG. 2 shows a schematic fan case 23 as is known in the prior art. A liner assembly 96 is directly adjacent to the fan case 23 and includes a rubstrip. Velocity ω is provided by the fan (not shown) in the forward direction. During a fan blade out (FBO) event, fan blade tips (not shown) dig into the rubstrip on the liner assembly 96, creating reactive rub torque forces T1 and T2. These torque forces T1 and T2 can be very high.

Figure 3:
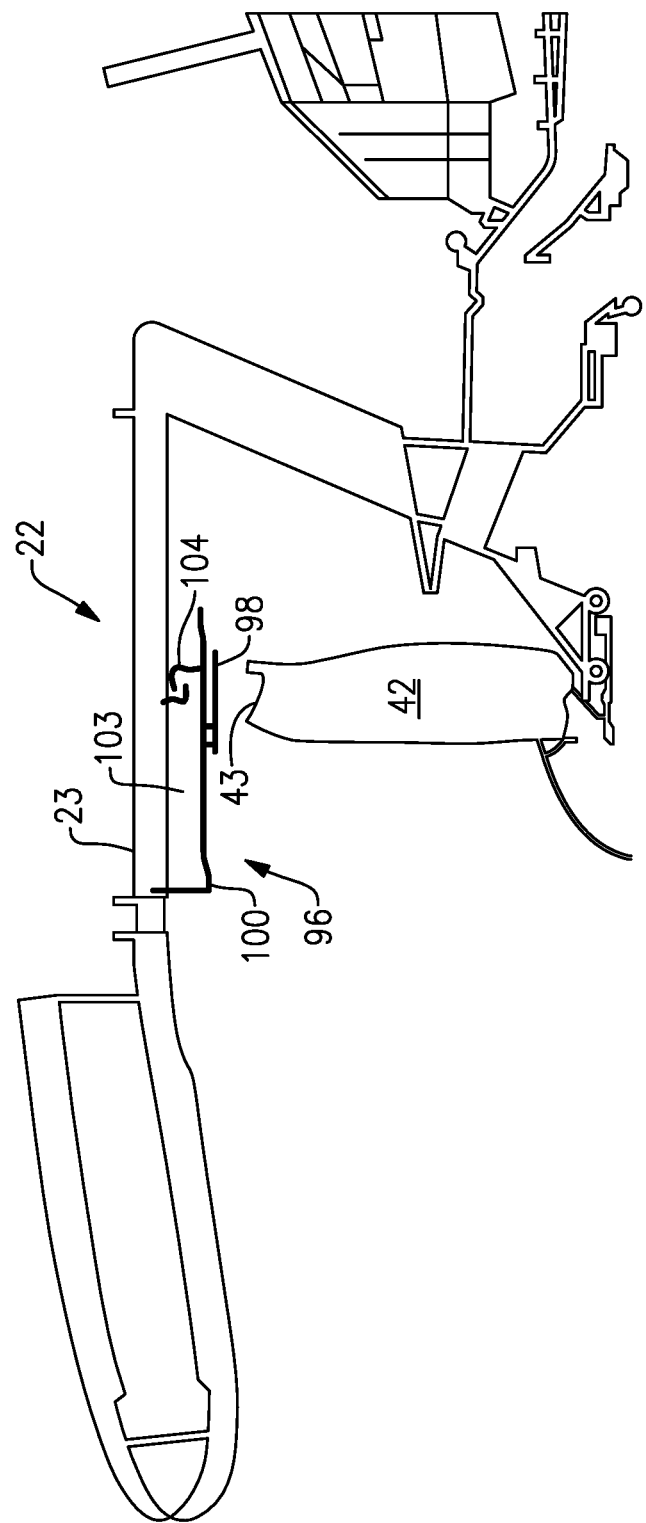
FIG. 3 illustrates a schematic detail view of the inventive gas turbine engine fan case.
Figure 4:
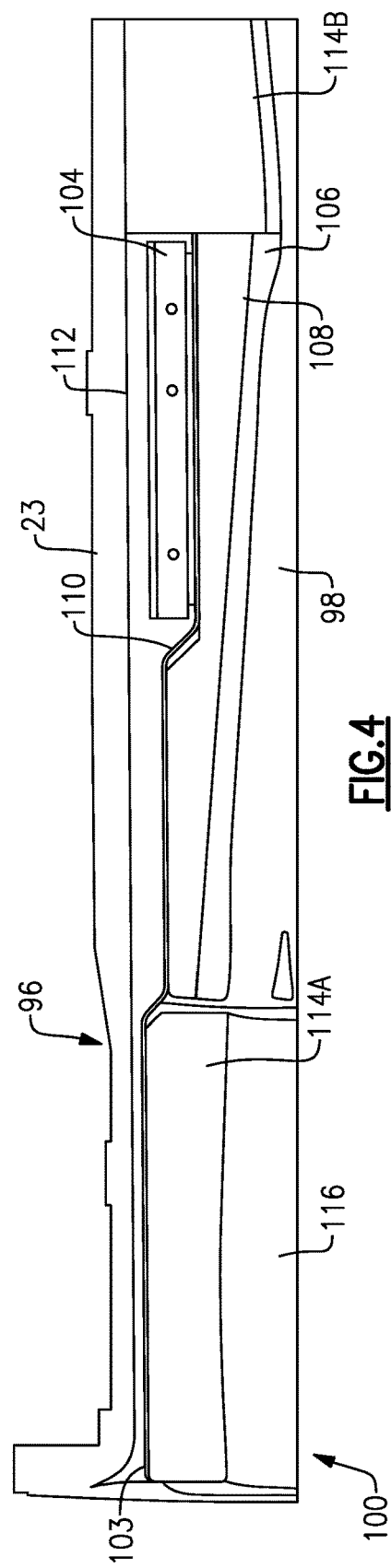
FIG. 4 illustrates a schematic view of a thermally conformable liner.

Referring to FIGS. 3 and 4 schematically depicting the disclosed embodiment, the fan case 23 includes a liner assembly 96 with a thermally conformable liner (TCL) 100. The TCL 100 may reduce rub torque forces translated to the fan case 23 in an FBO event. The TCL 100 may be cantilevered and "float" such that there is a gap 103 between the TCL 100 and the fan case 23. The TCL may include a rub strip 98, one or more torque stops 104, an aluminum septum 106, a honeycomb 108, and an aluminum liner 110. The rub strip 98 may include an abradable material. The aluminum liner 110 and aluminum septum 106 may be 0.04 inches (1.02 mm) thick. A high strength material 112 such as Kevlar® may also be present adjacent to the fan case 23 and may be bonded to the fan case 23 with an adhesive. An acoustic liner 114a may be radially inward of the aluminum liner 112. An acoustic liner 114b may also be bonded to the fan case 23 with an adhesive. An aluminum support shell 116 may be radially inward of the acoustic liner 114a.

Figure 5:
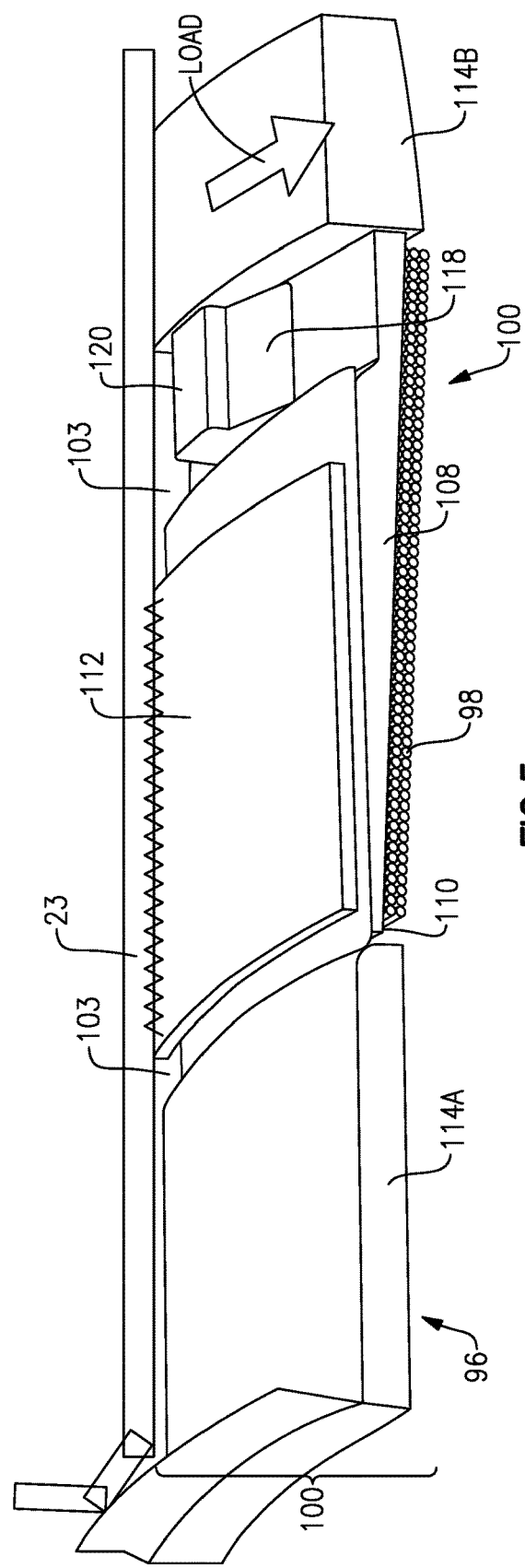
FIG. 5 illustrates an alternate schematic view of the thermally conformable liner of FIG. 4.

Referring to FIG. 5, rails 118 may be glued to the aluminum liner 110. The rails 118 may include blocks 120, which may be glued to the fan case 23 with an adhesive.

Certain features including the size of the gap 103, the application of a coating or surface treatment to reduce friction in the gap 103, the material properties of the stop 104, and the flexibility of the TCL 100 can be analytically determined for each engine application to significantly reduce the FBO loads transmitted to the fan case 23. In one example, the ratio of the gap 103 width to the fan 42 blade radius is 0.25:40. In another example, the fan case 23 or the TCL 100 may have a surface coating or treatment to reduce surface-to-surface friction in the gap 103, for example, a Teflon® coating on one or both of the fan case 23 radially inner surface and the TCL 100 radially outer surface.

In a further example, the one or more torque stops 104 may be frangible, anti-rotation stops, which may reduce loads transmitted between the fan blade tip 43 and the rubstrip 98. The TCL 100 may be connected to the fan case 23 by an adhesive as was described previously. In one example, the stop 104 and the adhesive may be designed to withstand a tangential load given by the equation $(1+S)*T_{Rub}/R_{FanCase}/N_{TorqueStops}$ where S is a safety factor to ensure that a small bird strike does not damage the TCL 100, $T_{Rub}$ is the rub torque generated by a 2.5 lb (1.3 kg) bird strike, $R_{FanCase}$ is the radius of the fan case, and $N_{TorqueStops}$ is the number of torque stops 104. $T_{Rub}$ is variable and may depend on blade flexibility, material composition, and other factors. In one example, S is 0.35.

As a result of lower fan case 23 rub torque peaks, other hardware in the load path, including mounts, can also be decreased by about 5-20%.

Although example embodiments have been disclosed, a worker of ordinary skill in this art would recognize that certain modifications would come within the scope of the claims. For that and other reasons, the following claims should be studied to determine their true scope and content.

What is claimed is:

1. A fan section for a gas turbine engine, comprising:
a fan case surrounding a fan with fan blades;
a liner disposed between the fan case and the fan, spaced a radial distance from the fan case to provide a gap, the liner including an aluminum liner; and
at least one torque stop arranged between the fan case and the aluminum liner, the at least one torque stop includes a rail glued with an adhesive to the aluminum liner and a block glued with the adhesive to the fan case, wherein the at least one torque stop is frangible, the at least one torque stop prevents rotation of the liner relative to the fan case, wherein the at least one torque stop and the adhesive can withstand a tangential load given by the equation $(1+S)*T_{Rub}/R_{FanCase}/N_{TorqeStops}$ where S is a safety factor, $T_{Rub}$ is a rub torque generated by a 2.5 lb (1.3 kg) bird strike, $R_{FanCase}$ is a radius of the fan case, and $N_{TorqeStops}$ is the number of torque stops.

2. The fan section of claim 1, wherein the ratio of the radial distance to a radius of the fan blades is 0.25:40.

3. The fan section of claim 1, wherein at least one of a radially inner surface of the fan case and a radially outer surface of the liner includes a low-friction coating.

4. The fan section of claim 3, wherein the low-friction coating is a polytetrafluoroethylene spray.

5. The fan section of claim 1, wherein at least a portion of the liner is bonded to the fan case with an adhesive.

6. The fan section of claim 1, wherein S is 0.35.

7. The fan section of claim 1, wherein the torque stop includes one or more rails which contact the fan case.

8. The fan section of claim 1, wherein the liner includes an abradable rubstrip adjacent to tips of the fan blades.

9. The fan section of claim 8, wherein the abradable rubstrip is arranged radially inward from the at least one torque stop.

10. The fan section of claim 9, wherein a honeycomb structure is arranged between the at least one torque stop and the abradable rubstrip.

11. The fan section of claim 10, wherein an aluminum septum is arranged between the at least one torque stop and the abradable rubstrip.

12. The fan section of claim 11, wherein an aromatic poly-amide fiber layer is arranged between the at least one torque stop and the fan case.

* * * * *